Feb. 24, 1970  P. D. JOHNSON  3,497,754
EFFICIENT INCANDESCENT LIGHT SOURCE INCLUDING LIGHT-ENHANCING
METALLIC IODIDE VAPORS
Filed Nov. 8, 1967
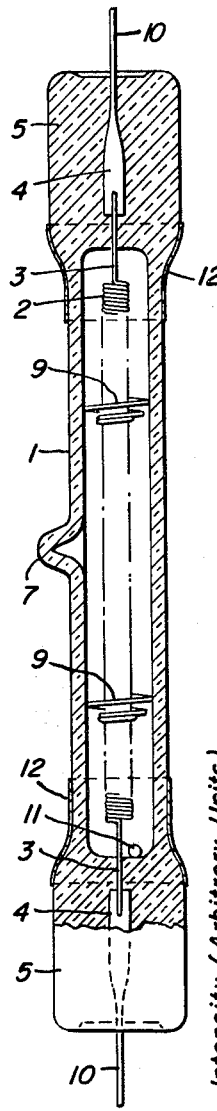
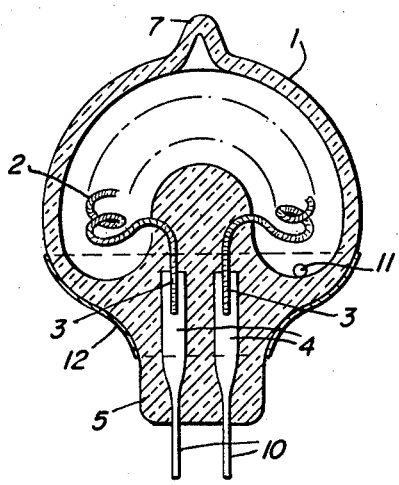
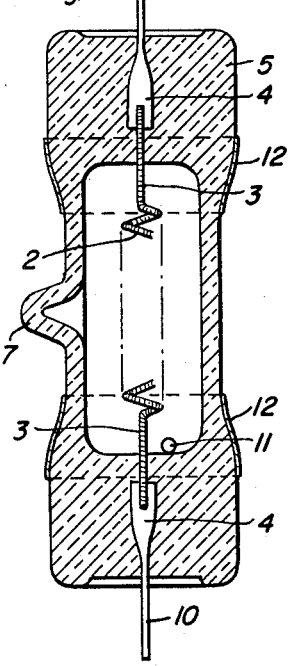
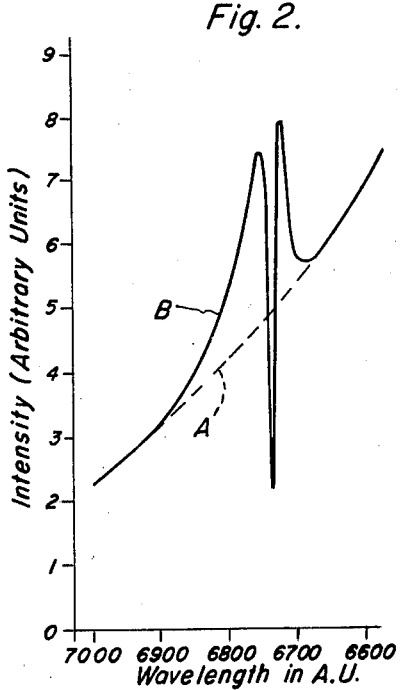
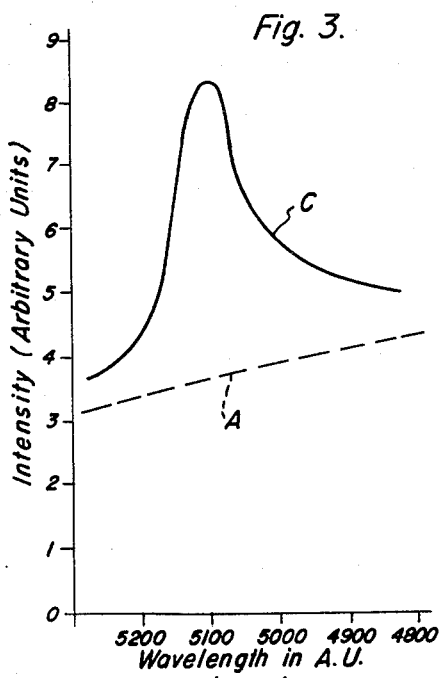
Inventor:
Peter D. Johnson,
by John F. Ahern
His Attorney.

United States Patent Office 3,497,754
Patented Feb. 24, 1970

3,497,754
EFFICIENT INCANDESCENT LIGHT SOURCE INCLUDING LIGHT-ENHANCING METALLIC IODIDE VAPORS
Peter D. Johnson, Schenectady, N.Y., assignor to General Electric Company, a corporation of New York
Continuation-in-part of application Ser. No. 580,995, Sept. 21, 1966. This application Nov. 8, 1967, Ser. No. 681,489
Int. Cl. H01k
U.S. Cl. 313—222                                17 Claims

ABSTRACT OF THE DISCLOSURE

An incandescent lamp with improved efficiency includes a volatilizable substance within the lamp envelope. Upon heating of the lamp filament to incandescence, the volatilizable substance becomes at least partially converted to the vapor state and is thermally excited to cause emission of radiant energy which enhances and adds to the efficiency of the incandescent radiation.

---

This application is a continuation-in-part of my co-pending application Ser. No. 580,995, filed Sept. 21, 1966, and assigned to the present assignee and now abandoned. The present invention relates to improved incandescent lamps and, more particularly, to such lamps having improvements in efficiency due to the addition thereto of vaporizable substances which are excited to thermal radiation in the absence of an electric discharge by the incandescence of a tungsten, or other incandescent material, filament to cause the addition of the characteristic radiation of the vaporizable substance, appropriately modified, to be superimposed upon the characteristic radiation of the incandescent filament.

For many years the incandescent lamp has been the standard source of illumination, particularly for low power applications wherein color rendition is of great importance. Unfortunately, the theoretical and practical maximum efficiencies of an incandescent filament are relatively low, since the radiation therefrom is substantially black-body radiation and only a minor fraction thereof lies within the visible spectrum, the greatest proportion thereof being dissipated in the form of heat.

One of the most efficient commercially feasible incandescent lamps presently available is the trademarked Quartzline Lamp, as for example, that which is disclosed by Fridrich et al. Patent No. 2,883,571, issued Apr. 21, 1959, and assigned to the General Electric Company. In the lamp of this patent and subsequent improvements thereof, longlife efficiencies of up to approximately 20 lumens per watt for a lamp life of several thousand hours are obtainable. Efficiencies, in specialty uses, when only 10 to 15 hours of life, for example, are expected, of approximately 35 lumens per watt are also obtainable.

While the desirable features and advantages of that type lamp are set forth in the aforementioned Fridrich et al. patent, in general, high efficiency is obtainable by virtue of the close proximity of the incandescent filament to the bulb walls which facilitates heating thereof; the large mass of the filament which is a tightly wound helical coil disposed along the central axis of the narrow quartz envelope; the uniformly high operating temperature of the filament; and the use of the iodide regenerative cycle, dependent in part upon the heat of the bulb walls, for prevention of bulb wall darkening and filament deterioration.

Although the efficiency of incandescent lamps have been pushed to their reasonably expected maximum by such lamps as described above, it is desirable that further increase in efficiencies be obtained.

Accordingly, an object of the present invention is to provide incandescent electric lamps having superior efficiencies to any such lamp as heretofore available.

A further advantage of the present invention is to enhance the efficiency of incandescent lamps by the addition of vaporizable, thermally-radiating species into the envelope thereof.

Still another object of the present invention is to utilize efficient vaporizable, light-emitting compounds to enhance the radiation of incandescent lamps.

Yet another object of the present invention is to provide electric lamps having improved light-emitting characteristics which may be readily constructed by presently available techniques and which are inexpensive and possess long-life characteristics.

Briefly stated, in accord with the present invention, I provide improved incandescent lamps having configurations wherein the ambient temperature within the envelope is sufficient to cause the volatilization and excitation to light-emitting energies of certain types of additives to incandescent lamps. Such additives may, in one embodiment, be dissociable halides of metals, which dissociate at the filament and exist thereat substantially in the atomic specie and emit the characteristic line spectra of the excited metal atom. Alternatively, in another embodiment, the additive may be a vaporizable metal halide which does not completely dissociate, but becomes excited in the vapor state existing in the vicinity of the filament substantially as molecular species, and emits the spectra of the excited molecule, either the added halide, a sub halide or a combination of the two.

If the first alternative is utilized, mercury is also added in a quantity as to establish a super-atmospheric pressure to enhance the radiation efficiency of the spectral emission. If the latter alternative is chosen, no mercury need be added, but is preferably present. In the lamps of one embodiment of the invention, the light emission of the filament is enhanced by the characteristic atomic spectra of the metal of the included halide, appropriately modified by the super-atmospheric pressure of mercury, to optimize the energy output of the radiation from the vaporizable halide and its constituents. In another embodiment of the invention the radiation of the incandescent filament is enhanced by the band spectra of excited molecular species.

The novel features believed characteristic of the present invention are set forth in the appended claims. The invention itself, both as to its preferred embodiments and mode of operation, together with further objects and advantages thereof, may best be understood with reference to the following detailed description taken in connection with the appended drawing in which:

FIGURE 1 is a vertical cross-sectional view of a schematic representation of a lamp constructed in accord with the present invention, FIGURE 2 is a plot of intensity of radiation as a function of wavelength for a lamp constructed in accord with one embodiment of the invention, illustrating, in part, the improvement in efficiency of light output thereof, FIGURE 3 is a plot of intensity of radiation as a function of wavelength of a lamp constructed in accord with another embodiment of the invention, illustrating, in part, the improvement of the efficiency of light output thereof, FIGURE 4 is a vertical cross-sectional view of an alternative structure for lamps of the invention utilizing an alternative filament structure, and FIGURE 5 is a vertical cross-sectional view of a single-ended lamp constructed in accord with the invention.

In FIGURE 1, a high-efficiency, incandescent vapor-emitting lamp includes a light transmissive evacuable bulb or envelope 1 containing therein an incandescent filament 2, in the form of a tightly coiled helix, terminating in a pair of longitudinal stubs 3 which are each fused to a thin ribbon-like lead 4 which is sealed in hermetic relationship through a pinch 5 which forms a closed, hermetically-sealed bulb. The bulb is filled and/or evacuated through nipple 7. Filament 2 is supported in a stationary position within envelope 1 by a plurality of coiled spring supports 9 which are abutted in spring tension between filament coil 2 and the interior wall of cylindrical envelope 1.

Cylindrical envelope 1 may conveniently be comprised of a light-transmissive, high-temperature resistant material, as for example, fused silica, quartz, or high-density alumina, as disclosed in Coble Patent No. 3,026,210 or other similar light-transmissive polycrystalline refractory oxides. If such an oxide material is utilized, pinch seal 5 is replaced by a more appropriate seal for such less-pliable substances, as for example, the seals disclosed in my copending application Ser. No. 512,498, filed Dec. 8, 1965, and assigned to the present assignee, now Patent 3,363,134. Filament 2 is of one form of a conventional incandescent filament material, such as a suitably-doped as, for example, thoriated tungsten wire which may, for example, be of 0.003 inch to 0.008 inch diameter, which is coiled in a tightly wound helix, as for example, around a 0.030 inch non-ferrous mandrel. In one particular lamp in accord with the invention, designed to operate at a rated power of 500 watts, a typical filament may be of approximately 100 turns per inch and may have a weight of approximately 50 to 100 milligrams per 100 millimeter of length. In such lamps, the total length of the helix is approximately 60 to 80 millimeters long, while the total length of the envelope 1 is approximately 115 millimeters long and is constructed of 10 millimeter O.D., 8 millimeter I.D. fused quartz. The volume deferred by the helical filament is substantial, i.e. of the order of 10 percent to 50 percent of the volume within the lamp envelope.

Lead wires 10 are made of molybdenum, for example, and are flattened out to a substantially foil-like thickness of approximately 0.001 inch at 4 to provide a strain-free seal through pinch 5 to achieve hermetic sealing. Tungsten stubs 3 are spot-welded to foil portion 4 of molybdenum leads 10. While the forementioned dimensions and parameters have been recited with respect to a typical 500 watt, high-efficiency incandescent lamp, substantially as is shown in the aforementioned Fridrich et al. patent and is now well known in the art, appropriate and well-known modifications may be made for various power inputs for different size lamps by competent lamp designers.

In accord with the present invention, a filling 11 of a plurality of vaporizable substances is contained within the lamp envelope. The purpose of filling 11 within the lamp envelope is to provide a vaporizable substance or substances which is volatilized by the heated filament and, either in the volatilized state or in a dissociated state, raised to such an excited state, that return to the unexcited state results in the emission of radiant energy within the visible spectrum which enhances the radiation of the incandescent filament and increases the radiant output and the operating efficiency of the lamp.

In one embodiment of the invention, filling 11 comprises first, a sufficient quantity of mercury as to establish under operating conditions, when all of the mercury therein is vaporized, a pressure of from approximately 1 to 20 atmospheres of mercury vapor. In this embodiment, filling 11 also contains a quantity of a vaporizable halide, other than the fluoride, of a metal which has a characteristic resonance or near-resonance radiation within the desired spectral range, preferably within the visible spectrum or with a plurality of high intensity radiating lines within the same range. Such metals include the alkali metals, sodium, potassium, and rubidium, the rare earth-like metals of Group III of the Periodic Table such as scandium, and yttrium, the metals of Group IIIb of the Periodic Table such as gallium, indium, and thallium, and the lanthanide series rare earth metals, but preferably cerium, erbium, gadolinium, holmium, neodymium praseodymium, and ytterbium. Of the materials set forth above, for applications in which the primary radiation is desired to be within the visible spectrum, it is preferred that lithium, sodium, thallium, yttrium, scandium, gadolinium and praseodymium be utilized. While the iodides of these materials are the most readily available and most readily vaporizable of the halides utilized, certain other characteristics of bromides and chlorides make their utilization preferable to the iodides, under certain circumstances.

The lamps of the present invention are lamps which operate with a high temperature in the area occupied by the vaporizable material added to the envelope. The high temperature is supplied by the incandescent filament which operates at a uniformly high temperature approximately 2500° K. to 3300° K. For this reason, the lowest temperature on the interior of the bulb wall must be equal to or higher than the temperature at which the vaporizable compound may exit in equilibrium between the vapor phase and its solid or liquid phase, depending upon that which is normal. Suitable temperatures exit when the minimum bulb wall temperature is in the range of approximately 400° C. to 1200° C. For this reason it is desirable, for low pressure operation, that all of the mercury in the bulb be vaporized. This is not difficult, since the vaporization temperature of the mercury is not high. It only requires that the quantity of mercury which is added to the bulb be a relatively small quantity, as opposed to the large quantities found in mercury pool electrode-type devices, and that the quantity of mercury is such that when totally vaporized the pressure within the bulb is within approximately 1 to 20 atmospheres. I prefer, however, that the mercury pressure to be within the range of 3 to 10 atmospheres. A pressure of mercury of at least 3 atmospheres assures that necessary line broadening occurs. Maintaining the pressure of mercury at a pressure of 10 atmospheres or less minimizes the effects of self-absorption of radiation and minimizes the possibility of explosion of the bulb. For a bulb as described with respect to FIGURE 1, a pressure of 3 atmospheres of mercury may conveniently be established by the addition of approximately 25 milligrams of mercury to the bulb envelope. Similarly, a pressure of 10 atmospheres may be achieved by the addition thereto of 80 milligrams of mercury and a pressure of 20 atmospheres may be obtained by the addition thereto of a quantity of approximately 160 mgs. of mercury.

It is not necessary that all of the vaporizable halide of the light-emitting material added be volatilized in accord with this embodiment of the present invention. Thus, it is convenient and practicable to add an excess of these materials in order to insure having a sufficient quantity of the material present within the lamp to establish an optimum amount of light radiating vapor over its entire operating life. Conveniently, the pressure of each metallic halide present within the bulb should be within the range of approximately 0.1 to 500 torr partial pressure. If more than one metallic vaporizable light-emitting specie is added, the quantity of each should be such as to establish an independent partial pressure within this range within the bulb under operating conditions.

Although lamps in accord with the present invention may be constructed utilizing quantities of vaporizable metallic halides within the foregoing range, I find it preferable that the quantity of material be such so that approximately .5 to 100 torr partial pressure of the vaporizable halide be present under operating conditions. The addition of higher quantities makes possible the maintenance of a reservoir of these materials so that should they "clean up" by deposition upon the bulb wall, or by decomposition or by recombination or by any other means, there may always be an optimum quantity of the partial pressure of the light-emitting vapors within the envelope. For lamps as described in FIGURE 1 having the volume described, I have, for example, been able to provide useful and improved incandescent lamps using each of sodium iodide, lithium iodide, and thallium iodide by adding from 1 to 10 mgs. of the iodide and preferably approximately 5 mgs. of the iodide. When combinations of two or more of the iodides are utilized, an independent quantity, as set forth above, of each is added.

Under certain circumstances, lamps in accord with this embodiment of the present invention may tend to darken by the deposition of the metal of the vaporizable halide upon the bulb wall. Similarly, there is a tendency for metallic particles from the incandescent filament to deposit upon the bulb wall. In order to prevent this contingency, it is convenient to add a quantity of free halogen to the charge within the bulb envelope in order that the well-known halogen vapor regenerative cycle may be utilized to cause clean-up of any such deposit. Thus, for example, in lamps constructed in accord with this embodiment of the present invention, when iodides of the light-emitting metallic specie are added, I find it convenient to add approximately .1 to 10 torr partial pressure of free iodine. This addition, when using excess metallic iodides is not necessary for the operation of the lamp because I find that the well-known iodide cycle for prevention of clouding of the interior bulb wall is usually operative by virtue of the iodine present because the addition of the excess metallic iodide and the subsequent decomposition of the iodide into its constituents by the heat of the incandescent filament.

Similarly, I find that in the environment of the present lamps, darkening of the bulb wall and filament deterioration is avoided with the use of bromine or chlorine in place of iodine, either as excess halide or as the additional elemental additive. Since it is essential that the coolest part of the bulb wall be maintained at a temperature high enough to preclude the condensation of all of the metallic light-emitting halide, in accord with this embodiment of the present invention; namely, within the range of 400° C. to 1200° C., depending upon the halide used, I find it convenient to add to the exterior of the bulb walls, in the vicinity of the end seals, a heat shield, which may, for example, be in the form of a silvered or platinized outer portion of the end of the envelope wall represented by 12 in FIGURE 1 of the drawing, or an outer coating of, for example, white zirconium oxide paint. Heat shield 12 reduces radiation from the seal region and tends to make this portion hotter, thus precluding its becoming a cold reservoir at which the light-emitting halides may tend to condense and, thus, be removed from the atmosphere within the envelope.

In the operation, the lamps of this embodiment of the invention behave substantially as follows: Upon connection to a source of appropriate electric power, the incandescable coiled filament 2 is heated to incandescence, rapidly raising the temperature thereat to a value in excess of approximately 3300° K. The mercury is first vaporized completely, establishing a high pressure of mercury of from approximately 1 to 20, but preferably approximately 3 to 10 atmospheres, within the lamp envelope. As the temperature of the coolest portion of the envelope wall rises to the temperature at which substantial vaporization of the metallic halide occurs, the halide is vaporized and surrounds the incandescent filament with a sheath of vaporized halide which dissociates into its constituents, at the filament sheath temperature, namely, the metal and the halogen vapors. Because of the thermal excitation of the metallic atoms due solely to the high temperature in the filament sheath surrounding the incandescent filament and within the very close envelope wall, the metallic atoms are raised to a spectroscopic energy level which permits a radiative energy transition and the emission of the characteristic line spectrum of the metal. Generally, the primary radiation from the thermally-excited metallic specie within the envelope is the resonance radiation line, usually the lowest permitted radiative transition for the metal, a transition either to the ground state or to a state very close to the ground state of the atom. Typical wavelengths for these resonance radiation lines are as follows:

TABLE I

|    | AU |
|----|-----|
| Li | 6707 |
| Na | 5890 and 5896 |
| K  | 7664 and 7698 |
| Rb | 7948 and 7860 |
| Tl | 5350 |
| Ga | 4032 and 4172 |
| In | 4101 and 4511 |

The elements scandium, yttrium, and the lanthanide series rare earth metals set forth hereinbefore do not emit solely a resonance line or a resonance doublet, as do potassium, rubidium, gallium, and indium, but emit many lines which cover essentially the entire range of the visible spectrum.

Two important features of this embodiment of the present invention, essential for operation of the improved incandescent lamps thereof, include the fact that the ionization of the vaporizable light-emitting halides, and the temperatures thereof are insufficient to permit an arc or glow discharge involving the metal vapor species, so that there is no electric discharge within the lamp, but only thermal ionization and thermally-excited radiation from the vaporized species. Additionally, the improvement achieved is not only a result of the addition of spectral line-emitting materials, but that the presence of mercury in the disclosed quantities, greatly increases the enhancement due to these materials.

The non-discharge mode of operation is contrasted to, and differs entirely in kind, from the lamps disclosed in Reiling Patent No. 3,234,421, in which certain vaporizable metal halides are utilized in a lamp under such conditions as to cause a high current light-emitting arc to exist. Lamps of the present invention not only differ in mode of operation, but do not require the ballast transformers necessary for the operation of arc lamps. This is readily achieved by avoiding conditions which would cause the breakdown potential of the atmosphere within the envelope to be so low that an electrical breakdown could occur between any two portions of filament 2. More specifically, the configuration and pressure must avoid the region of the minimum of the Paschen curve for the system. This is facilitated by the use of vaporizable halides, the vapors of which have high breakdown potentials. Additionally, the presence of a low pressure of, for example, less than 250 torr of any noble gas must be strictly avoided.

Secondly, the improved radiation from the lamps of the present invention is not due solely to the addition of the line spectra of the radiation specie being superposed upon the continuum radiation of the incandescent filament. If the latter were the case, due to the narrow width of the lines of radiation from the metallic species utilized (generally less than one-tenth AU), the increase in light output and efficiency of operation would be infinitesimal. An important feature of this embodiment of the present invention is the necessity of a high pressure of mercury within the lamp bulb volume. This mercury pressure causes the radiation of the excited species to undergo a phenomenon known as "line broadening" which causes the width of the emission of the resonance or near-resonance radiation (or of the multiplicity of lines of the rare earth metals) of the metallic species to increase from a width of the order of approximately less than 0.1 AU to a width of from up to 10 to 100 AU or more. This phenomenon of line broadening, due to atomic collisions with the high pressure of mercury vapor within the lamp, causes an increase in the addition of light output to the lamp by virtue of the vapor radiation, of at least a factor of 5000 times over that which would be present in the absence of the added high pressure of mercury which causes "line broadening" and the attendant increase in power of vapor radiation. Since the effect of each additive is dependent upon its partial pressure and, since each is substantially independent of the other, any desired combination of dissociable metallic vaporizable light-emitting halides may be made, to further increase efficiency or "tailor" light emission.

FIGURE 2 of the drawing illustrates one example of the manner in which the efficiency of lamps constructed in accord with this embodiment of the present invention may be improved by the utilization of an appropriate vaporizable, dissociable light-emitting metallic halide. Curve A of FIGURE 2, which is a plot of intensity of light output (in arbitrary units) as a function of wavelength (in angstrom units) is the uncorrected (for the particular spectrometer used) plot of the normal incandescent emission of the lamp illustrated in FIGURE 1 of the drawing utilizing only incandescent radiation. Curve B of FIGURE 2 illustrates the total light output (uncorrected for the same spectrometer used) of the same lamp in accord with FIGURE 1, to which 10 mgs. of lithium iodide and 40 mgs. of mercury have been added.

In FIGURE 2, the input power that is transformed into useful optical radiation is the area under the curve, which may be obtained quantitatively by integration to determine the area. Thus, for a computation of the total light output from the conventional incandescent lamp, integration of the area under curve A is an indication. To obtain the amount of radiation from lamps in accord with the present invention, as represented by the specific example of curve B, in which lithium iodide was added, integration of the area under curve B is an indication. As may readily be seen from FIGURE 2, the area under curve B is substantially increased over the area under curve A by the addition of the line-broadened peak occurring roughly between 6650 and 6900 AU, which is decreased only by a narrow self-absorption trough occurring at approximately 6710 AU. Other broadened lines for other specific vaporizable metallic halides, as set forth hereinbefore, show similar, and often improved additions, to the spectral emission. The combination of several such peaks, preferably at different wavelength regions, substantially increases light output.

The practical efficiency which may be obtained by a combination of the vaporizable metallic halide in accord with the present invention to incandescent lamps having the proper configuration to cause sufficient heating and energization of the metal of the added halide is capable of raising the efficiencies of such lamps to as high as 40 lumens per watt, obtainable over a useful lifetime in excess of 2000 hours.

In accord with another embodiment of the present invention, the volatilizable substance which is added to the lamp envelope, comprises a halide, other than the fluoride, of a polyvalent metal which volatilizes at the lamp wall temperature and may partially dissociate at the filament temperature but does not completely dissociate at the operating temperature of the lamp filament, which exists in the filament sheath substantially in the molecular species, and which is excited by the thermal energy thereof to cause the radition of a molecular spectrum, which adds to and enhances the efficiency of the incandescent radiation. In accord with this embodiment, the volatilizable halide may, for example, be a halide of a metal such as tin, zinc, cadmium, mercury, germanium, lead, arsenic, and antimony, which does not totally dissociate at the sheath temperature and which is excited thereby to emit molecular radiation, I preferably utilize $SnBr_2$, $SnI_2$, $SnCl_2$, $SbI_3$, since the increase gained thereby is optimum in the visible spectrum.

In accord with this embodiment of the present invention, the operating parameters of the lamp are substantially the same as in the first described embodiment with certain important differences. Initially, the same structure lamp may be utilized and the same closeness of the filament to the bulb wall is desirable. Thus, the entire interior of the bulb is at such a temperature so as to cause elevation of the volatilized metallic halide to a sufficiently high energy state so that molecular radiation is emitted by the radiative transition of the molecule from higher to lower energy states.

The bulb wall temperature in this embodiment, as with the previously described embodiment, should be a minimum of 400° C. to 1200° C. to insure complete volatilization of mercury (if present) and sufficient volatilization of the metallic halide. The excitation temperature, the temperature of the incandescent filament which causes the excitation of the volatilizable vapors, should be in the range of 2500° K. to 3300° K. The amount of the volatilizable metallic halide used to produce the molecular radiation in accord with this embodiment of the invention may conveniently be an amount sufficient to produce a partial pressure of approximately 0.1 to 500 torr of each volatilizable halide present, and preferably, should be sufficient to produce a partial pressure of approximately 10 to 200 torr of each metallic halide. As in the previous embodiment, the halide may be added to an excess so that, at the operating temperature of the lamp all of the halide is not volatilized, to preclude the exhaustion of the halide from the lamp by deposition of the metallic component, by entrapment, or other phenomena known to cause depletion within an electric lamp. One lamp according to this embodiment, was as illustrated in FIGURE 4, had a volume of 2.5 cc., was operated with a bulb wall temperature of approximately 600° C. and contained 26 mgm. of $SnBr_2$ and approximately 11 mgm. of mercury. This lamp operated at a mercury pressure of approximtaely 2 atmospheres.

Unlike the previously disclosed embodiment, the presence of mercury within the envelope of the incandescent lamp is not essential for operation of lamps in accord with this embodiment. This is because in the previously discussed embodiment, the radiation caused by the thermal influence of the filament upon the volatilizable substance was the atomic spectra of the metal of the metallic halide. In accord with that embodiment, the metallic halide has a dissociation temperature lower than that of the filament and substantially all of the vaporizable metallic halide in the vicinity of the filament is dissociated, causing the metallic atom to be raised to a high enough energy so as to emit resonance radiation. The resonance radiation, being a relatively narrow line or lines, does not, in and of itself, greatly enhance the luminous efficiency of the lamp. This is done by the line emission, in cooperation with the mercury pressure, which causes collision line-broadening of the atomic spectra.

In accord with this embodiment of the invention, however, the metallic halide which is volatilized is not dissociated, since its dissociation energy is sufficiently high that, at most, only a partial dissociation occurs. Even in the case of partial dissociation, the halides in accord with this embodiment of the invention do not totally dissociate but exist as a sub-halide which also is excited to emit molecular radiation. Under operating conditions, the metallic halides of the present embodiment exist substantially in the molecular species at the filament sheath. As is well known to the art, molecular spectra are not in the nature of lines of narrow width, but constitute broad bands.

In FIGURE 3 of the drawing, the enhancement obtained over a portion of the visible spectrum by the addition of stannous bromide to lamp, such as that illustrated in FIGURE 1 of the drawing, is compared with the black-body radiation of the incandescent filament alone. In FIGURE 3, curve A represents, in arbitrary units as a function of wavelength, the amount of radiation emitted by an incandescent filament alone in a lamp such as illustrated in FIGURE 1. Curve C of FIGURE 3 indicates the combined incandescent radiation and the molecular spectral radiation in the presence of 200 torr of stannous bromide within the source lamp.

As may be seen from the curves of FIGURE 3 of the drawing, the addition of the volatilizable molecular-spectra-emitting metallic halide, in accord with the present invention, not only increases the radiant output of an incandescent lamp, but this radiation also appears as a broad band of radiation having a band width of hundreds of angstrom units, so that it is not necessary that a mercury atmosphere be present to collision-broaden the emission of the volatilized, but not entirely dissociated, metallic halide of this embodiment of the invention.

For another reason, however, it is desirable that mercury be present within the lamps in accord with this embodiment of the invention, although not necessarily so. The reason for the addition of mercury to the lamps of the present embodiment is that it is desirable, for the attainment of maximum efficiency, that the incandescent filament be surrounded by a sheath of high temperature vapors to cause the molecular spectral emission region to encompass as large a portion of the bulb envelope volume as is possible. This allows as much of the volatilized metallic halide present within the vapor state as is possible to be engaged in the radiative process, for high efficiency.

This optimum is achieved by maintaining the filament at as high a temperature as possible by insulating the filament from the bulb wall to as great a degree as is possible, commensurate with the requirement that the bulb wall must have a temperature within the range consistent with maintaining the required partial pressure of the volatilizable metallic halide within the envelope. Actually, the thing to be avoided is too great heat loss by conduction. Such heat loss by conduction is kept at a minimum by the inclusion of mercury in a pressure range of from 1 to 20 atmospheres, and preferably within a range of from 3 to 10 atmospheres. Since mercury vapor is a high molecular weight vapor, there is a large thermal inertia present when the mercury is present at high pressures and, therefore, the presence of mercury within the desired pressure range causes the loss of heat by conduction from the filament, and the volume immediately surrounding it to be greatly reduced. Accordingly, it is preferred, in this embodiment of the invention, that a quantity of mercury of the order of 1 to 20 atmospheres and preferably 3 to 10 atmospheres is maintained within the envelope to increase the efficiency.

The actual mechanism of the molecular line emission of this embodiment of the invention is not fully understood. That the radiation is primarily, if not entirely, molecular is certain, for the radiation is of band spectrum type. It is not yet possible to identify the exact radiating species. Thus, excitation energy calculations indicate that the observed thermally-excited vapor radiation is not that of the added compound. Likewise, the radiation does not correspond to the characteristic radiation of the pure subhalide (the monohalide) as reported in the literature (cf. G. Herzberg, "Spectra of Diatomic Molecules," D. Van Nostrand, 1950). Apparently, the strong emission characteristic of the vapor addition in lamps of the present invention is a unique one resulting from excitation of the vapors by the temperature of the incandescent filament. One strong possibility is that the radiation is due to a transition from one species of halide to another.

Lamps in accord with this embodiment of the invention operate substantially as follows:

When the incandescent filament is energized, the temperature thereof rises to a value of approximately 2500° K., rapidly volatilizing all mercury present within the envelope (although none need be present) and simultaneously raising the temperature of the bulb wall so that the coldest part thereof is in excess of 400° C. to cause at least partial volatilization of the polyvalent, high-temperature partially-dissociable, metallic halide within the envelope to establish a partial pressure thereof for each metallic halide within the range of approximately 0.1 to 500 torr. When the volatilized metallic halide comes within the region of the filament, hereinafter referred to as the filament sheath, the sheath temperature raises the molecules of the vaporized metallic halide to an energy sufficient to cause emission of a band spectrum due to molecular transitions. Simultaneously, some of the original metallic halides may be dissociated into the subhalides which, likewise, emit band spectral radiation within the visible spectrum to cause the enhancement of the incandescent radiation from the filament sheath.

Lamps constructed in accord with this embodiment of the present invention, are capable of showing an increase in efficiency of the same order of the lamps described in the first embodiment of the invention, namely, up to approximately 40 lumens per watt efficiency.

FIGURE 4 of the drawing illustrates an alternative structure for lamps of the present invention. In FIGURE 4, which is quite similar to the embodiment illustrated in FIGURE 1, like elements are identified by like reference numbers to those utilized in FIGURE 1. Filament 2, rather than being a solid wire coiled in a tightly wound helix, is a loosely wound helix of, for example, 0.003 inch thoriated tungsten wire, first wound in a 0.030 inch ID helix having an inside diameter of, for example, 0.10 inch and is disposed within a quartz envelope with a quartz envelope with the same general structure as envelope 1 of FIGURE 1, but which has an inside diameter greater in relationship to the diameter of the helix than that of the device of FIGURE 1. Thus, for example, utilizing the loosely wound coiled-coil configuration, a coiled-coil helix having an outside diameter of approximately 0.1 inch and a coil length of approximately 0.5 inch may be incorporated within a quartz envelope 1 having a total length of approximately 0.7 inch and an inside diameter of approximately 0.3 inch.

The necessary criteria for the operation of lamps in accord with the present invention, namely, that the filament temperature be within the range of approximately 2500° K. to 3300° K. and that the minimum inside bulb wall be maintained at a temperature sufficiently high enough to ensure substantially complete evaporation of all of the mercury therein to establish a partial pressure thereof of 1 to 20 atmospheres and preferably 3 to 10 atmospheres, and sufficiently high enough to cause a substantial vaporization of an optimum quantity of the chosen vaporizable metallic halide, which temperature range has been determined to be approximately 400° C to 1200° C., depending upon the particular vaporizable halide or halides utilized, are all met. They may be met in this configuration because the coiled-coil helix presents a more extended length for current conduction and allows for a sufficiently higher temperature to be achieved by the filament with the loosely coiled filament as opposed to the tightly wound filament utilized in the single coil helix configuration.

Secondly, due to the coiled-coil configuration, the walls may be spaced at a greater distance from the filament because the heat radiation from the filament is greater than from the tightly wound coil utilized in FIGURE 1. Nevertheless, the proportion of volume defined within the coiled-coil filament is substantially of the order of 10 percent or more of the lamp volume. In essence, in the embodiment of the device of FIGURE 4, the entire area within the larger coiled helix, and immediately surrounding it, constitutes a large sheath or oven wherein a very high temperature exists which is not much less than the temperature of the filament itself, thus causing a larger volume of excited vaporizable metallic halide which is available to radiate the spectra of the atomic or molecular species thereof. The configuration of the device of FIGURE 4 is particularly suitable for high intensity, small dimension lamps.

FIGURE 5 illustrates an additional structural embodiment of the invention. In FIGURE 5, only a single pinch 5 is utilized and the coiled-coil configuration utilized in the device of FIGURE 4 is also utilized, with the modification that the larger helical coil is bent into a configuration that is arcuate in nature. This allows the exterior perimeter of the helix to conform substantially to the inner bulb wall surface contour, so that the exterior of the bulb wall is at substantially the entire length of the filament, thus minimizing the incidence of cold spots. The configuration of the inner end of pinch 5 is similarly adjusted to maintain an even bulb wall temperature.

To prevent the area of the pinch from becoming a cold sink into which metallic halide is condensed, a suitable coating as, for example, an outer metallic reflecting or an outer white zirconium oxide paint coating 12, may be added to this area. This insures that, as with the embodiments of FIGURES 1 and 4, the coldest portion of the inner bulb wall is above a temperature which insures a sufficient amount of vaporizable metal halide to be always present in the vapor phase within the bulb during operation thereof. As discussed hereinbefore, this temperature may be from approximately 400° C. to 1200° C., deepnding upon the least volatile halide present. Similarly, the volume defined by the coiled-coil filament is substantially, of the order of 10 percent or more of the lamp volume.

From the foregoing it is evident that I have provided improved incandescent lamps having high efficiencies wherein the incandescable filament within the lamp is closely spaced to the lamp envelope wall is a relatively high temperature, such as to volatilize metallic halides which are added to the lamp envelope to increase the efficiency thereof. The metallic halides, which are added to the lamps in accord with the present invention, fall into two different classes, each of which is effective, in accord with a separate embodiment of the invention, to improve the efficiency of incandescent lamps.

In accord with the first embodiment, the metallic halides which are vaporizable at temperatures from 400° to 1200° C. and are substantially completely dissociated at filament temperatures of 2500° K. to 3300° K. so that the vapors exist substantially in the form of atomic specie of the metals, which are raised in energy by the thermal action of the incandescent filament to radiate atomic line spectra, and of the free halogen. In further accord with this embodiment, a quantity of mercury sufficient to cause a pressure thereof of approximately 1 to 20 atmospheres in the envelope is added and is volatilized so that the spectral lines of the emitting metal atoms are broadened by collision with the mercury atoms to produce broad-band enhancement of the incandescent filament and greater light output.

In accord with the second embodiment of the invention, the metallic halides are vaporized at the bulb wall temperature, namely 400° C. to 1200° C., but they are not totally dissociated at the filament temperature of 2500° K. to 3200° K., but rather are, at most, only partly dissociated to produce sub-halides so that the vaporizable halide exists in substantially molecular species at the filament sheath. These molecular species are raised in energy by the heat of the filament and emit molecular spectra to enhance the light output of the incandescable filament. In accord with this embodiment, the presence of mercury is not required in order to cause collision line broadening, but the presence of from 1 to 20 atmospheres of mercury is desirable to prevent heat loss by conduction from the filament sheath to the bulb wall to keep the temperature of the filament sheath at an optimum value to increase radiant efficiency.

While the invention has been described herein with respect to certain embodiments thereof, many modifications and changes will readily occur to those skilled in the art. Accordingly, I intend by the appended claims to cover all such modifications and changes which fall within the true scope of the present invention.

What I claim as new and desire to secure by Letters Patent of the United States is:

1. A high efficiency incandescent lamp comprising:
    (a) an evacuable light transmissive envelope,
    (b) an incandescable filament located within and occupying a substantial portion of the total inner volume of said envelope,
    (c) a filling of vaporizable material within said envelope including
        ($c_1$) a quantity of mercury sufficient during operation of said filament to vaporize completely and produce within said envelope a pressure of mercury of approximately 1 to 20 atmospheres,
        ($c_2$) a quantity of at least one vaporizable metallic halide selected from the group consisting of the iodides, bromides and chlorides of sodium, potassium, rubidium, lithium, gallium, indium, thallium and the lanthanide series rare earth metals which vaporizes at the temperature of the coolest portion of the interior of said envelope to produce a partial pressure of vaporizable halide of approximately 0.1 to 500 mm. of mercury, the metal of said halide being excited to light-emission by the thermal energy of the heated filament, said light emission modifying the color and adding to the emission intensity of the radiation of said lamp in the absence of an electric discharge,
        ($c_3$) the constituents and the pressures thereof within said bulb being free of any low pressure, low ionization potential vapors during lamp operation to preclude gaseous breakdown and electric discharge therein,
    (d) the contour of the inner surface of said envelope and the configuration of said filament being such as to insure close spacing between the exterior of said filament and said inner envelope surface to maintain the coldest portion of said inner surface at a temperature of approximately 400° C. to 1200° C.

2. The lamp of claim 1 wherein the quantity of mercury present is sufficient to produce upon complete vaporization thereof a pressure of mercury vapor of 3 to 10 atmospheres.

3. The lamp of claim 1 wherein the partial pressure of the vaporized metallic halide is approximately 0.5 to 100 torr.

4. The lamp of claim 1 wherein the metallic halide is selected from the group consisting of lithium, sodium, yttrium, scandium, gadolinium, and praseodymium and the metal-emitted enhancing light is concentrated in the visible spectrum.

5. The lamp of claim 4 wherein the quantity of mercury is sufficient to produce upon complete vaporization thereof a mercury vapor of 3–10 atmospheres.

6. The lamp of claim 1 wherein the lamp envelope is an elongated cylindrical tube and the filament is a tightly wound helix spaced centrally along the longitudinal axis of substantially all of the open inner volume of said tubulation at a distance therefrom to assure the specified uniform high temperature thereof during operation.

7. The lamp of claim 1 wherein the filament is a coiled-coil helix with the larger coil thereof being one loosely spaced so as to allow free passage of gaseous and vaporized particles therethrough.

8. The lamp of claim 1 wherein the lamp envelope wall is arcuate and the filament is a loosely wound coiled-coil helix substantially equidistant from the inner surface of the bulb walls to maintain the specified uniform high temperature thereof and said lamp is single-ended in construction.

9. A high efficiency incandescent lamp comprising:
    (a) an evacuable light transmissive envelope, (b) an incandescable filament located within and occupying a substantial portion of the total inner volume of said envelope, (c) a filling of vaporizable material within said envelope including ($c_1$) a quantity of mercury sufficient during operation of said filament to vaporize and produce within said envelope a pressure of mercury of approximately 1 to 20 atmospheres, ($c_2$) a quantity of at least one vaporizable metallic halide selected from the group consisting of the bromides, iodides and chlorides of metals selected from the group consisting of tin, antimony, zinc, cadmium, lead, germanium and arsenic, which vaporizes at the temperature of the coolest portion of said envelope to produce a partial pressure of vaporizable halide of approximately 0.1 to 500 mm. of mercury, the metal of said halide being excited to light-emission by the thermal energy of the heated filament, said light emission modifying the color and adding to the emission intensity of the radiation of said lamp in the absence of an electric discharge, ($c_3$) the constituents and the pressures thereof within said bulb being free of any low pressure, low ionization potential vapors during lamp operation to preclude gaseous breakdown and electric discharge therein, (d) the contour of the inner surface of said envelope and the configuration of said filament being such as to insure close spacing between the exterior of said filament and said inner envelope surface to maintain the coldest portion of said inner surface at a temperature of approximately 400° C. to 1200° C.

10. The lamp of claim 9 wherein the partial pressure of the vaporized metallic halide is approximately 0.5 to 100 torr.

11. The lamp of claim 9 wherein said vaporizable metallic halide is not substantially dissociated so as to release metallic atoms but remains substantially in molecular state in the vicinity of said filament and is excited by the thermal energy thereof to emit molecular spectra to enhance the radiation of said filament.

12. The lamp of claim 9 wherein the vaporizable metallic halide exists within said envelope at a pressure of approximately 10 to 200 torr during operation.

13. The lamp of claim 9 wherein the vaporizable metallic halide is tin bromide.

14. The lamp of claim 9 wherein the vaporizable metallic halide is tin iodide.

15. The lamp of claim 9 wherein the vaporizable halide is tin chloride.

16. The lamp of claim 9 wherein the vaporizable halide is antimony triiodide.

17. The lamp of claim 9 wherein the quantity of mercury present is sufficient to produce upon complete vaporization thereof a pressure of mercury therein of 3–10 atmospheres.

References Cited

UNITED STATES PATENTS

| 2,883,571 | 4/1959 | Fridrich et al. | 313—179 |
| 2,920,222 | 1/1960 | Thorington | 313—222 X |
| 3,211,943 | 10/1965 | Cardwell | 313—222 X |
| 3,234,421 | 2/1966 | Reiling. | |
| 3,334,261 | 8/1967 | Butler et al. | 313—229 |

FOREIGN PATENTS

| 952,938 | 3/1964 | Great Britain. |

OTHER REFERENCES

Reiling, Characteristics of Mercury Vapor-Metallic Iodide Arc Lamps, April 1964, pp. 532–540.

JAMES W. LAWRENCE, Primary Examiner

C. R. CAMPBELL, Assistant Examiner

U.S. Cl. X.R.

313—184, 220, 221, 229, 315, 317